United States Patent
Cheatham, III et al.

(10) Patent No.: US 10,655,883 B2
(45) Date of Patent: *May 19, 2020

(54) SYSTEMS AND METHODS FOR REGULATING AN ENVIRONMENTAL VARIABLE WITHIN A TARGET ZONE HAVING MULTIPLE INHABITANTS

(71) Applicant: Elwha LLC, Bellevue, WA (US)

(72) Inventors: Jesse R. Cheatham, III, Seattle, WA (US); William David Duncan, Mill Creek, WA (US); Eun Young Hwang, Sausalito, CA (US); Roderick A. Hyde, Redmond, WA (US); Tony S. Pan, Bellevue, WA (US); Clarence T. Tegreene, Mercer Island, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 34 days.

This patent is subject to a terminal disclaimer.

(21) Appl. No.: 15/881,011

(22) Filed: Jan. 26, 2018

(65) Prior Publication Data
US 2019/0032946 A1 Jan. 31, 2019

Related U.S. Application Data

(63) Continuation of application No. 14/638,947, filed on Mar. 4, 2015, now Pat. No. 9,909,774.

(51) Int. Cl.
G05B 13/00 (2006.01)
F24F 11/62 (2018.01)
(Continued)

(52) U.S. Cl.
CPC .............. F24F 11/62 (2018.01); F24F 11/30 (2018.01); G05B 15/02 (2013.01); F24F 2120/10 (2018.01); G05B 2219/2614 (2013.01)

(58) Field of Classification Search
CPC .................................................. F24F 11/0086
(Continued)

(56) References Cited

U.S. PATENT DOCUMENTS 4,024,725 A * 5/1977 Uchida .............. G05D 23/1931
62/176.6
4,294,404 A 10/1981 Gajjar
(Continued)

FOREIGN PATENT DOCUMENTS

JP 02306040 A * 12/1990
JP 11190545 A 7/1999
(Continued)

*Primary Examiner* — Kenneth M Lo (57) ABSTRACT

A system and associated methods of operation for regulating an environmental variable (such as ambient room temperature) within a target zone. The system includes an occupancy sensor configured to monitor the target zone and determine a number of inhabitants present within the zone. The occupancy sensor generates an occupancy signal communicating the number of detected inhabitants to an environmental control system. Upon receiving the occupancy signal, the environmental control system regulates an environmental variable within the zone based on the number of inhabitants present in the zone.

40 Claims, 4 Drawing Sheets

(51) Int. Cl.
*G05B 15/02* (2006.01)
*F24F 11/30* (2018.01)
*F24F 120/10* (2018.01)

(58) Field of Classification Search
USPC .......................................................... 700/276
See application file for complete search history.

(56) References Cited

U.S. PATENT DOCUMENTS

| | | | |
|---|---|---|---|
| 5,170,935 A * | 12/1992 | Federspiel | G05D 23/1902 |
| | | | 236/44 C |
| 5,172,856 A * | 12/1992 | Tanaka | B60H 1/00742 |
| | | | 236/49.3 |
| 5,187,943 A | 2/1993 | Taniguchi et al. | |
| 5,384,716 A | 1/1995 | Araki | |
| 5,476,221 A | 12/1995 | Seymour | |
| 6,081,619 A | 6/2000 | Hashimoto et al. | |
| 6,471,087 B1 | 10/2002 | Shusterman | |
| 7,113,086 B2 | 9/2006 | Shorrock | |
| 7,243,503 B2 | 7/2007 | Lee | |
| 7,918,406 B2 | 4/2011 | Rosen | |
| 8,103,384 B2 | 1/2012 | Matsumoto | |
| 8,172,155 B2 | 5/2012 | Nakayama et al. | |
| 8,397,527 B2 | 3/2013 | Miller | |
| 8,791,592 B2 | 7/2014 | Kim | |
| 9,465,392 B2 | 10/2016 | Bradley | |
| 9,500,693 B2 | 11/2016 | Fujiwara et al. | |
| 9,643,471 B2 * | 5/2017 | Prakah-Asante | ............................ |
| | | | B60H 1/00807 |
| 2004/0249479 A1 | 12/2004 | Shorock | |
| 2008/0033252 A1 * | 2/2008 | Estrella | A61B 5/0002 |
| | | | 600/300 |
| 2009/0032604 A1 | 2/2009 | Miller | |
| 2009/0171506 A1 | 7/2009 | Donaldson et al. | |
| 2011/0272131 A1 | 11/2011 | Mikat | |
| 2012/0066168 A1 | 3/2012 | Fadell et al. | |
| 2012/0072032 A1 | 3/2012 | Powell | |
| 2012/0259470 A1 | 10/2012 | Nijhawan | |
| 2013/0226354 A9 | 8/2013 | Ruff et al. | |
| 2014/0277765 A1 | 9/2014 | Karimi et al. | |
| 2015/0028114 A1 * | 1/2015 | Rosen | G05D 23/1919 |
| | | | 236/51 |
| 2015/0088316 A1 | 3/2015 | Mise | |
| 2015/0233598 A1 * | 8/2015 | Shikii | F24F 11/30 |
| | | | 165/244 |
| 2016/0195856 A1 | 7/2016 | Spero | |
| 2016/0258643 A1 | 9/2016 | Cheatham, III et al. | |

FOREIGN PATENT DOCUMENTS

| | | |
|---|---|---|
| JP | 2001-078966 A | 3/2001 |
| JP | 2006336915 A | 12/2006 |
| JP | 2013-155924 A | 8/2013 |

* cited by examiner

SYSTEMS AND METHODS FOR REGULATING AN ENVIRONMENTAL VARIABLE WITHIN A TARGET ZONE HAVING MULTIPLE INHABITANTS

If an Application Data Sheet ("ADS") has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)).

Priority Applications

This application in continuation of U.S. patent application Ser. No. 14/638,947, filed Mar. 4, 2014, for "SYSTEMS AND METHODS FOR REGULATING AN ENVIRONMENTAL VARIABLE WITHIN A TARGET ZONE HAVING MULTIPLE INHABITANTS," with inventors Jesse R. Cheatham III, William David Duncan, Eun Young Hwang, Roderick A. Hyde, Troy S. Pan, Clarence T. Tegreene, and Victoria Y. H. Wood, which application is incorporated herein by reference in its entirety.

Related Applications

If the listings of applications provided herein are inconsistent with the listings provided via an ADS, it is the intent of the Applicants to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

The field of the present disclosure relates generally to systems and methods for regulating an environmental variable within a target zone, and in particular, to such systems and methods for measuring a skin parameter from one or more inhabitants occupying the target zone and regulating the environmental variable based on the measured skin parameters.

SUMMARY

The present disclosure describes various embodiments of systems and methods for monitoring and regulating certain environmental parameters in a particular zone, such as in a room or a building. For example, the system may measure a skin temperature from a person in a room and use that that measurement to regulate room temperature or another environmental variable to help maintain a comfortable environment for the person.

In one embodiment, the system includes a sensor system configured to monitor the target zone and measure the skin parameter from the inhabitant when present in the target zone. The system further includes a storage medium or memory having stored therein a threshold setpoint relating to the skin parameter. A processor in operative communication with both the sensor system and the storage medium determines a variance between the measured skin parameter from the inhabitant and the threshold setpoint stored in the storage medium. After determining the variance, the processor generates a signal to communicate the variance to an environmental control system, which in turn, regulates an environmental variable (such as room temperature) within the zone based on the calculated variance.

For example, in one embodiment, the measured skin parameter may indicate that the person has a skin temperature of 36° C. (about 97° F.), and the threshold setpoint may be 33° C. (about 91° F.), which is generally an average skin temperature for a human. The positive variance over the threshold setpoint may indicate that the person is warm or hot. Accordingly, the environmental control system may power on a fan, an air conditioning unit, or other suitable device to cool the room. Subsequent measurements of the person's skin temperature may be taken at regular intervals to determine when to turn off the cooling device.

In another embodiment, such as for multiple-person households, the storage medium may include a plurality of user profiles, each of which may have a variety of user-specific preferences associated therewith. For example, each user profile may include information such as preferred ambient temperature, humidity, or other variables specific to each individual person in the household. In such embodiments, the sensor system may further include a subsystem, such as an input system or an image acquisition system, to identify a particular user profile, such as when a person walks into a specific room. Once the user profile is identified, the processor may thereafter compare the measured skin parameter with the threshold setpoint for that specific user to determine whether and how to regulate the environmental variable to satisfy the specific user's needs.

In another embodiment, the sensor system may be configured to detect a presence of one or more inhabitants and determine a number of inhabitants present within the zone. Based on the number of inhabitants within the zone, the environmental control system may thereafter regulate the environmental variable. In some embodiments, the sensor system may measure the skin parameter from each of the one or more inhabitants, and the environmental control system may evaluate the measured parameters from the multiple inhabitants to regulate the environmental variable.

In some embodiments, the system may compile the individual parameters from each of the inhabitants and analyze the collective data to determine how to best regulate the environment to accommodate as many of the inhabitants as possible. In other embodiments, the system may instead identify an alpha person from the inhabitants in the room and measure a skin parameter (e.g., skin temperature, sweat, humidity) from the alpha person. The system may use the measured skin parameter from the identified alpha person to regulate the environmental variable regardless of the measurements of the other inhabitants in the room.

Additional details of these and other embodiments are described further below with reference to the accompanying drawings.

DETAILED DESCRIPTION OF EXAMPLE EMBODIMENTS

With reference to the drawings, this section describes particular embodiments of various safety systems and their detailed construction and operation. Throughout the specification, reference to "one embodiment," "an embodiment," or "some embodiments" means that a particular described feature, structure, or characteristic may be included in at least one embodiment of the safety system. Thus appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

Figure 1:
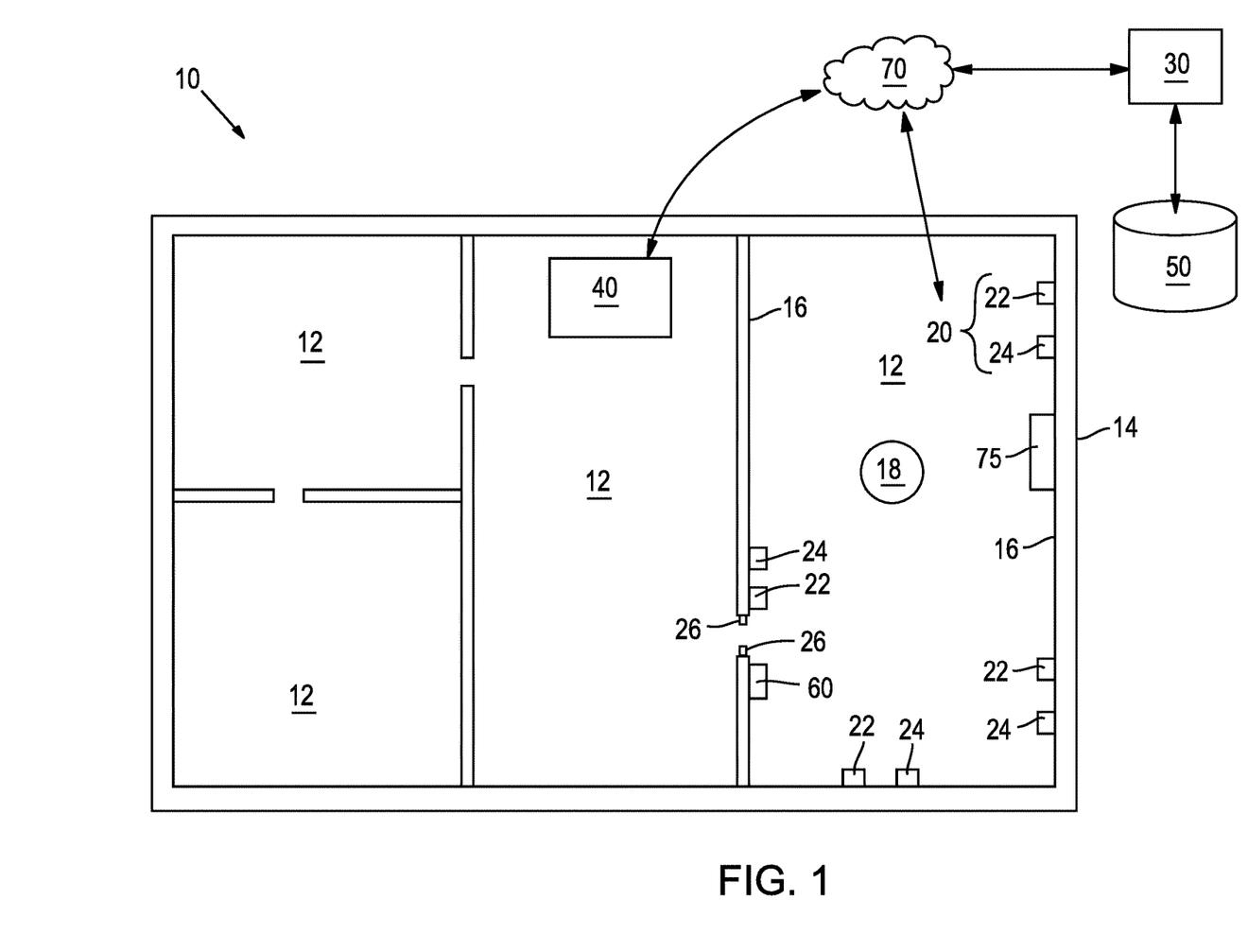
FIG. 1 is a schematic drawing of a system for regulating an environmental variable within a target zone, according to one embodiment.

FIGS. 1-5 collectively illustrate various embodiments of a system 10, 100 for regulating an environmental variable within a target zone or room 12. With particular reference to FIG. 1, the system 10 includes a sensor system 20 configured to monitor the room 12 and measure a skin parameter (e.g., skin temperature, skin humidity, sweat present on the skin) in real time from an inhabitant or occupant 18 (e.g., a person) in the room 12. A processor 30 in operative communication with the sensor system 20 receives the measured skin parameter and determines a variance between the measured skin parameter and a threshold setpoint that may be stored in a database or other storage medium 50. Thereafter, the processor 30 generates a signal to communicate the calculated variance to an environmental control system 40, which may be a heating, ventilation, and air-conditioning (HVAC) system. Based on the signal received from the processor 30, the environmental control system 40 determines whether and how to regulate an environmental variable (e.g., ambient room temperature and/or humidity) within the target zone 12 to create a comfortable environment for the person 18. For example, the environmental control system 40 may activate an air-conditioner or a heater to alter the room temperature in the room 12. The following description provides additional details of these and other embodiments of the system 10, 100.

FIG. 1 is a schematic drawing shown in a plan view of the system 10 for regulating an environmental variable. The system 10 is illustrated installed or integrated into a building 14, such as a dwelling, an office building, or any other suitable structure, having one or more rooms 12. In one embodiment, the building 14 is a personal residence having one or more rooms 12, such as a bedroom, living room, bathroom, and kitchen. In another embodiment, the building 14 is an office building having one or more rooms 12, such as an office, conference room, bathroom, and break room. To establish a frame of reference, the description of the system 10 proceeds with reference to its use in a personal residence. It should be understood that this convention is used for illustration purposes only and is not intended to limit application or use of the system 10 to a personal residence.

With reference to FIG. 1, the building 14 may include a plurality of rooms 12, each of which having one or more interior walls 16. A sensor system 20 may be mounted to or otherwise supported by one or more of the interior walls 16, ceilings, floors, or other interior surfaces in each of the rooms 12. The sensor system 20 includes one or more occupancy sensors 22 configured to monitor the room 12 and determine when an inhabitant 18 is present therein. Any one of a variety of sensors capable of detecting an inhabitant 18 may be suitable for use with the sensor system 20. For example, the sensors 22 may include any of the following: optical sensors, acoustic sensors, infrared sensors, photocell sensors, ultrasonic sensors, radar sensors, proximity sensors, pressure sensors/plates, weight sensors, Doppler sensors, motion sensors, or any other active or passive sensors.

The sensor system 20 also includes one or more measurement sensors 24 (such as infrared imaging system or cameras) that may be used to measure a skin parameter from the inhabitant 18 when the inhabitant 18 (e.g., a person or an animal) is present in the room. As mentioned previously, the skin parameter may be skin temperature used to determine whether the person 18 is too hot or too cold, at which point the environmental control system 40 regulates the room condition accordingly.

In other embodiments, the skin parameter may be the presence of sweat measured based on skin reflectivity. Skin reflectivity may be measured using one or a combination of specular reflective properties and diffuse reflective properties. For example, in some embodiments, the sensor system 20 may measure the presence of sweat based on spectral reflectance, polarization properties of reflected light, Terahertz spectroscopy, infrared spectroscopy, or visible light spectroscopy.

In some embodiments, the sensor system 20 may measure the skin parameter at only one time period, such as shortly after the person 18 walks into the room 12 (e.g., within five or ten minutes of the person being detected). The environmental control system 40 may thereafter use that measurement to determine whether and how to regulate the room condition. In other embodiments, the sensor system 20 may measure the skin parameter at various time points to determine a trend. For example, the sensor system 20 may measure the skin parameter at a first time point (e.g., within ten minutes of the person being detected). Thereafter, the sensor system 20 may obtain a second measurement at a second time point (e.g., five minutes after the first measurement) and a third measurement at a third time point (e.g., five minutes after the second measurement). This measurement data may be used to: (1) evaluate the trending behavior of the person's skin temperature to determine how to regulate the room condition; (2) monitor the person's skin temperature to determine when it is at a comfortable level so that the environmental control system 40 is shut off; or (3) for other suitable purposes as further explained in detail below.

In other embodiments, the sensor system 20 may also include door sensors 26 for determining whether the door to the room 12 is opened or closed. As is further explained in detail below, the processor 30 may be in communication with the sensor system 20 and with the environmental control system 40, where the processor 30 transmits a signal to the environmental control system 40 indicating whether the door is opened or closed. Based on this information, the environmental control system 40 may determine how to best regulate the temperature (or other environmental variable) of the room 12 accounting for the condition of the door. For example, if the door is opened, the environmental control system 40 may continue powering the air-conditioning unit a bit longer to account for the additional heat that may be coming into the room from the outside environment.

In some embodiments, the system 10 may include a monitoring system 60 with one or more sensors (not shown) positioned on or adjacent a door (or other entrance/exit) of the room 12 to monitor when the inhabitant 18 has entered or left the room 12. The monitoring system 60 may be a subsystem of the sensor system 20 or may be a separate system in communication with the sensor system 20. In one embodiment, the monitoring system 60 may include one or more light curtains (not shown) having one or more light beams traversing a doorway or other portion of the room 12 to detect the presence of the inhabitant 18. Briefly, the light curtain may comprise one or more transmitters and receivers (such as photoelectric cells), where each of the transmitters project one or more light beams toward the receivers (not shown). Preferably, the light beams are infrared light beams so that they are not visible to the inhabitant 18 for aesthetic purposes, but may be other types of light beams. In some embodiments, the light curtains may further include one or more reflectors (not shown) configured to reflect light from one of the transmitters to one or more of the receivers, which allows the receivers to be mounted on the same surface as the transmitters. When the light curtain is triggered (e.g., a person traverses one or more light beams), the monitoring system 60 (or sensor system 20) generates a signal indicating that a person is in or out of the room. In some embodiments, two or more light curtains may be spaced apart from one another and used to determine a direction of motion of the inhabitant 18 (e.g., by monitoring the order in which they are triggered) into or out of the room 12.

With reference to FIG. 1, the system 10 further includes a storage medium or database 50. The storage medium 50 may have stored therein a threshold setpoint relating to the skin parameter. The threshold setpoint may be used as a target skin temperature or baseline representing an ideal skin temperature at which the person would be most comfortable. As is explained in further detail below, the environmental control system 40 may use the variance between the measured skin temperature and the threshold setpoint to determine whether and how to regulate the room temperature. In one embodiment, the threshold setpoint may be set at an average or mean skin temperature of 33° C. (about 91° F.) for a human. In other embodiments, the threshold setpoint may be set higher or lower than 33° C. (about 91° F.), depending on the specific needs or preferences of the inhabitant.

In some embodiments the storage medium or database 50 may further include a plurality of user profiles stored therein, where each of the user profiles includes one or more user-specific variables. Each user profile may have a specific threshold setpoint stored for a particular user to accommodate that user's needs. For example, a husband may be comfortable when his skin temperature is 32° C. (about 90° F.) and a wife may be comfortable when her skin temperature is 34° C. (93° F.). Accordingly, the husband's profile may set the threshold setpoint at 32° C. and the wife's profile may set the threshold setpoint at 34° C. In this fashion, the system 10 is able to better accommodate the specific needs of individual users by using a user-specific threshold.

In such embodiments, the system 10 may further include an imaging subsystem 75 configured to acquire an image of the inhabitant 18 when present in the room 12. The imaging subsystem 75 (or processor 30) may thereafter identify the inhabitant 18 from the image to determine which target user-profile to select. In other embodiments, the system 10 may optically or electronically detect a badge or tag (e.g., a badge with barcode, an RFID tag, etc.), to identify the inhabitant 18 and select the corresponding user profile. In other embodiments, the system 10 may include a user input device (not shown), such as a keypad, keyboard, microphones or other suitable device, to allow the inhabitant 18 to select a user profile. As is further discussed below in detail, the system 10 may be configured to determine which one of multiple inhabitants to monitor when both the husband and the wife are in the room 12 at the same time.

The system 10 further includes a processor 30, such as a personal computer, mobile phone, tablet, laptop, or other suitable device, that may be within the building 14 or remotely located. The processor 30 is in operative communication with the sensor system 20 and the storage medium 50, such as via a network 70. After the sensor system 20 measures the skin parameter, the sensor system 20 generates a sensor signal communicating the measured skin parameter to the processor 30, which upon receiving the signal, queries the database 50 to call up the threshold setpoint. Thereafter, the processor 30 determines a variance between the measured skin parameter and the threshold setpoint and transmits an operation mode signal to the environmental control system 40.

As mentioned previously, the environmental control system 40 is in operative communication with the processor 30 and receives the operation mode signal. Based on this signal, the environmental control system 40 determines how to regulate the environmental variable, such as room temperature or humidity, to provide a comfortable setting for the inhabitant 18. In some embodiments, the environmental control system 40 is a heating, ventilation, and air-conditioning (HVAC) system having a heating mode and a cooling mode. In such embodiments, the environmental control system 40 may heat and/or cool the room 12 depending on the variance of the measured skin parameter and the threshold setpoint as determined by the processor 30. It should be understood that while the processor 30 and environmental control system 40 are described as distinct subsystems, in some embodiments, the processor 30 may be integrated into the environmental control system 40 to form a single system.

The following section describes various examples illustrating a process that may be used to regulate an environmental variable of the room 12 via the system 10. In one example process, the inhabitant or person 18 walks into the room 12 after coming home from a run and sits down to stretch and rest. When the person 18 walks in, the one or more of the occupancy sensors 22 of the sensor system 12 detects the presence of the person 18 in the room 12. Thereafter, one or more measurement sensors 24 measure the skin temperature of the person 18 in the room 12 to be 36° C. (about 97° F.) and generates a sensor signal communicating this measurement to the processor 30. Upon receiving the signal, the processor 30 queries the storage medium 50 to determine the threshold setpoint for that user (e.g., 33° C. or 91° F.). In this example, the processor 30 determines that the person's skin temperature is higher than the threshold setpoint (i.e., a positive variance), meaning that the person 18 may be warm or hot. The processor 30 communicates this information via an operation mode signal to the environmental control system 40, which, upon receiving the operation mode signal, directly or indirectly activates a cooling mode to apply cool air into the room 12 to decrease the ambient temperature in the room 12. In some embodiments, the environmental control system 40 may also (or instead) deactivate a heating mode to avoid increasing the ambient temperature in the room 12.

In another example, the inhabitant 18 may walk into the room 12 after walking outside in the snow. When the person 18 walks into the room 12, the measurement sensors 24 of the sensor system 20 may measure the skin temperature of the person 18 in the room 12 to be 31° C. (about 88° F.). In this example, the processor 30 determines that the person's skin temperature is lower than the threshold setpoint (i.e., a negative variance), meaning that the person 18 may be cold. The processor 30 communicates this information via an operation mode signal to the environmental control system 40, which, upon receiving the operation mode signal, directly or indirectly activates a heating mode to apply heat to the room 12 and increase the ambient temperature in the room 12. In some embodiments, the environmental control system 40 may also (or instead) deactivate a cooling mode to avoid decreasing the ambient temperature in the room 12.

In some embodiments, the sensor system 20 may further be configured to determine an ambient temperature within the target zone or room 12, which may help the system 10 anticipate the needs of the person 18 before the person 18 occupies the room 12. For example, if the ambient temperature is 20° C. (68° F.) in the room 12, the person 18 may get cold shortly after entering the room 12. With the sensor system 20 monitoring the ambient room temperature, the environmental control system 40 may be activated to heat the room to a comfortable room temperature (e.g., 22-23° C. or 72-73° F.) before the person 18 occupies the room 12 to minimize any potential discomfort after the person 18 is in the room 12. Once the person 18 enters the room 12, sensor system 20 may obtain the skin parameter measurement to determine how to adjust the conditions of the room 12.

In some embodiments, the threshold setpoint stored in the storage medium 50 may be periodically updated based on the ambient temperature in the room 12 and/or on the environmental temperature outside the building 14 to account for external factors (other than a person's skin temperature) that may affect a person's level of comfort. For example, a person walking into a 72° F. room may feel comfortable when the exterior temperature is 40° F., but that same 72° F. room may not feel as comfortable when the exterior temperature is 100° F. By taking external factors into account, the environmental control system 40 may provide a more comfortable environment for the user as compared to simply taking skin temperature into account. Similarly, in other embodiments, the threshold setpoint stored in the storage medium 50 may be updated based on the time of day and/or time of year (e.g., a calendar date), and expected temperatures for the of day and/or year.

It should be understood that skin temperature is only one example parameter that may be measured by the sensor system 20 and used to regulate an environmental variable in the room 12. In other embodiments, the sensor system 20 may measure the presence of sweat on the user's skin (such as when the person returns from a run or other workout) and the processor 30 may compare the measurement to a threshold setpoint stored in the storage medium 50. In a similar fashion as described previously, the processor 30 may transmit an operation mode signal to the environmental control system 40 to activate a cooling mode and/or deactivate a heating mode to regulate the temperature within the room 12.

As mentioned previously, in some embodiments, the sensor system 20 may measure the skin parameter at various time points to determine a trend of the skin parameter over time. This trend data may be used to determine how to regulate the room condition to a comfortable level for the user. For example, the sensor system 20 may measure the skin parameter at a first time point (e.g., within ten minutes of the person being detected), a second measurement at a second time point (e.g., five minutes after the first measurement) and a third measurement at a third time point (e.g., five minutes after the second measurement), and so on. The following section describes example processes for regulating room conditions using the trend data.

In one example, the processor 30 may determine a first variance between the measured skin parameter and the threshold setpoint at the first time point, and a second variance between the measured skin parameter and the threshold setpoint at a second time point. Once the variances are determined, the processor 30, at a third time point at or after the second time point, may determine a variance trend indicating whether the skin parameter has increased or decreased from the first time point to the second time point. In another example, the processor 30 may determine a first variance between the measured skin parameter and the threshold setpoint at the first time point, a second variance between the measured skin parameter and the threshold setpoint at a second time point, and a third variance between the measured skin parameter and the threshold setpoint at the third time point. Once the variances are determined, the processor 30, at a fourth time point at or after the third time point, may determine a variance trend indicating whether the skin parameter has increased or decreased from the first time point to the second time point, from the first time point to the third time point, and/or from the second time point to the third time point. When the variance trend indicates that the skin parameter has decreased, the operation mode signal directly or indirectly activates a heating mode of the environmental control system 40 to regulate the environmental variable within the target zone 12. Conversely, when the variance trend indicates that the skin parameter has increased, the operation mode signal directly or indirectly activates a cooling mode of the environmental control system 40 to regulate the environmental variable within the target zone 12.

For example, in some embodiments, the skin parameter may be skin temperature, the environmental control system 40 may be an HVAC system having a heating mode and a cooling mode, and the environmental variable may be ambient room temperature. In such embodiments, when the variance trend indicates that the skin temperature has decreased, the heating mode of the HVAC system may be activated to apply heat (e.g., by turning on a heater) to the room 12 to increase the ambient temperature. Alternatively, if the variance trend indicates that the skin temperature has increased, the cooling mode of the HVAC system may be activated to apply cool air (e.g., by turn on an air conditioning unit, or a fan) to the room 12 to decrease the room temperature.

In some embodiments, the heating and/or cooling mode may be activated to regulate the environmental variable within a predetermined tolerance range based on the variable trend. For example, if the variable trend indicates that the skin temperature is decreasing over time, the environmental control system 40 may automatically apply heat to the room 12 to increase the ambient room temperature until it settles at a range of 70-74° F. (or any other suitable range). Conversely, if the variable trend indicates that the skin temperature is increasing, the environmental control system 40 may automatically cool the room 12 to decrease the ambient room temperature until it settles at a range of 68-72° F. (or any other suitable range).

The foregoing examples illustrate certain embodiments where the processor 30 calculates a variance trend to determine whether and how the environmental control system 40 should regulate the room 12. In other embodiments, the processor 30 may instead directly monitor the skin temperature (e.g., without calculating a variance trend) and determine the variance between the skin temperature and the threshold setpoint measured at the multiple time points to determine whether the skin temperature is increasing or decreasing. In such embodiments, the environmental control system 40 may regulate the room 12 (e.g., apply heat or cool air) depending on whether the skin temperature is increasing or decreasing as measured over the first, second, and third time points.

In other embodiments, the processor 30 may further determine a rate of change relating to the skin parameter based on the first and second time points, where the environmental control system 40 may apply heat (in a heating mode) or cool air (in a cooling mode) at a rate corresponding to the rate of change. For example, if the skin temperature of the inhabitant 18 decreases 1° F. from the first time point to the second time point, the environmental control system 40 may apply heat to the room 12 to increase the ambient room temperature by 1° F.

Figure 2:
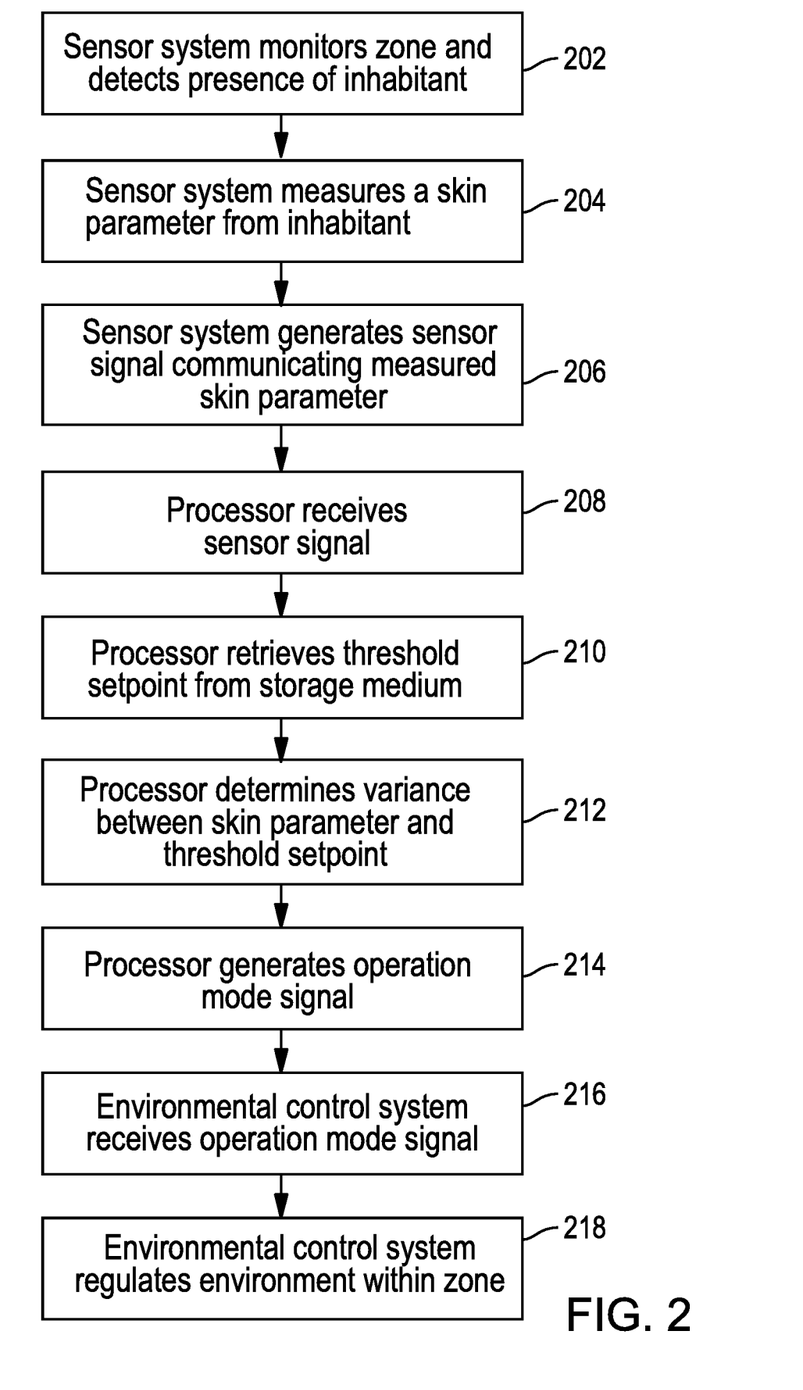
FIG. 2 is a block diagram illustrating a method for regulating an environmental variable within a target zone, according to one embodiment.

FIG. 2 is a block diagram illustrating a method of regulating an environmental variable in a target zone according to one embodiment. It should be understood that the method described below is for illustration purposes and the order in which the steps are described is not meant to be limiting. In addition, it should be understood that in other embodiments, the steps may occur in a different order. With particular reference to FIG. 2, in some embodiments, at step 202, a sensor system monitors a target zone to detect a presence of an inhabitant (such as a person or an animal) within the room. Once the inhabitant is detected, the sensor system, measures a skin parameter (such as skin temperature or sweat) from the inhabitant at step 204.

At step 206, the sensor system generates a sensor signal communicating the measured skin parameter to a processor. At step 208, the processor, which is in operative communication with the sensor system and a storage medium, receives the sensor signal from the sensor system. At step 210, the processor queries the storage medium to retrieve a threshold setpoint relating to the skin parameter stored therein. In some embodiments, the threshold setpoint may be a target skin temperature that the user may have previously indicated corresponds with a comfortable environment (i.e., the user is comfortable at the target skin temperature). In other embodiments, the threshold setpoint may be a mean or average skin temperature at which an average human is comfortable (e.g., 33° C. or about 91° F.).

At step 212, once the threshold setpoint is obtained, the processor determines a variance between the measured skin parameter and the threshold setpoint, the variance indicating whether the skin parameter is greater than or less than the threshold setpoint. In some embodiments, the processor may also determine an ambient or base temperature in the room. Thereafter, at step 214, the processor generates an operation mode signal based on the determined variance between the measured skin parameter and the threshold setpoint.

At step 216, an environmental control system receives the operation mode signal, which communicates to the environmental control system whether the measured skin parameter is greater than or less than the threshold setpoint. In some embodiments, the operation mode signal may also communicate the ambient room temperature. In response to receiving the operation mode signal, the environmental control system, at step 218, regulates the target zone to create a comfortable environment for the inhabitant. As mentioned previously, in one example, when the measured skin parameter is greater than the threshold setpoint (perhaps indicating that the inhabitant may be warm), the environmental control system may activate a fan or air conditioner to apply cool air to the room and decrease the ambient room temperature. Conversely, if the measured skin parameter is less than the threshold setpoint, the environmental control system may heat the room to increase the ambient room temperature.

In some embodiments, the storage medium may further include a plurality of user profiles, each of the plurality of user profiles having a user-specific threshold setpoint associated therewith to allow various users to have customized settings. In such embodiments, the processor, at step 210 may further query the storage medium to access a particular user profile and obtain that user's threshold setpoint. As discussed previously, the user profile may be obtained via an imaging subsystem (such as a camera), may be input by a user (such as via a keypad or other input device), or otherwise provided via other suitable means.

Figure 3:
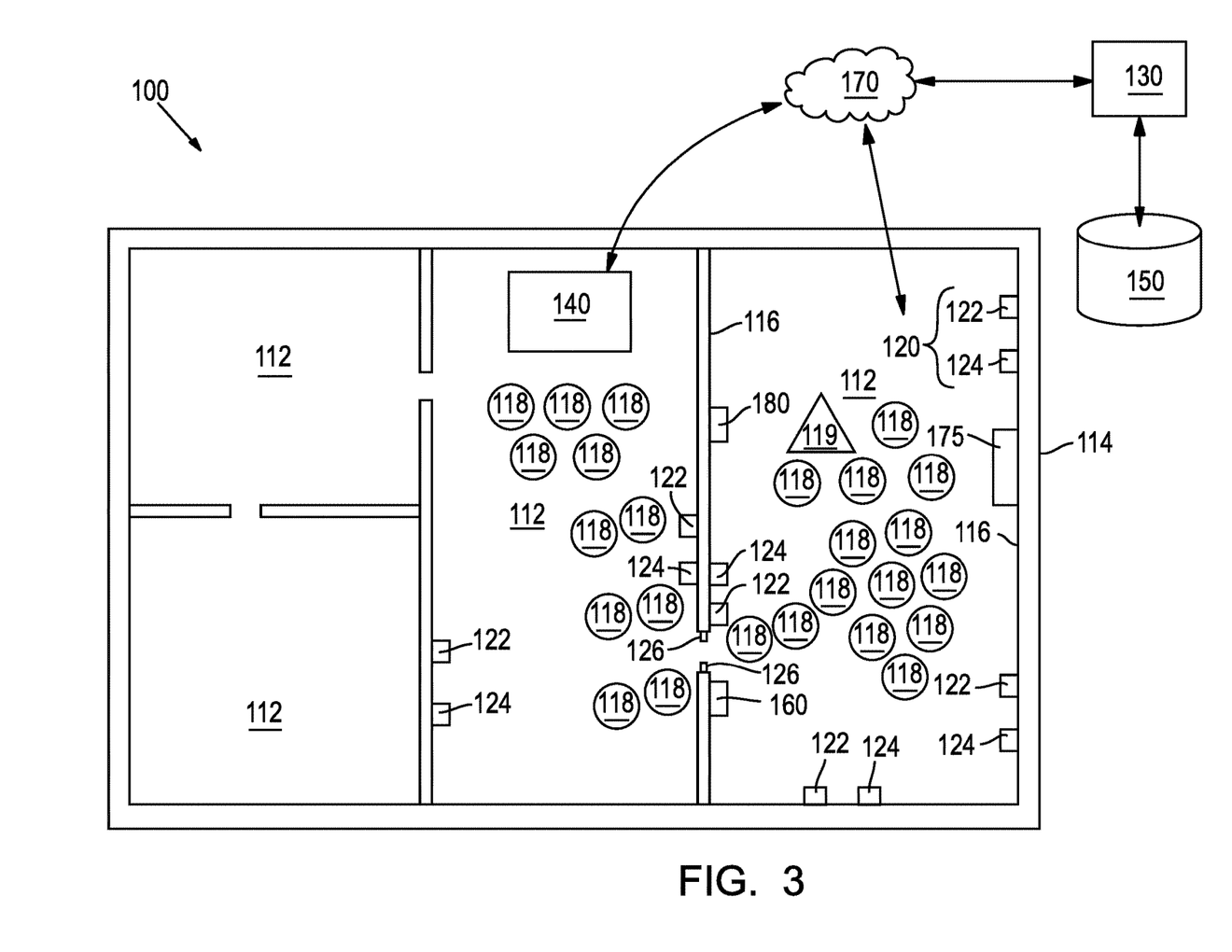
FIG. 3 is a schematic drawing of a system for regulating an environmental variable within a target zone, according to one embodiment.
Figure 4:
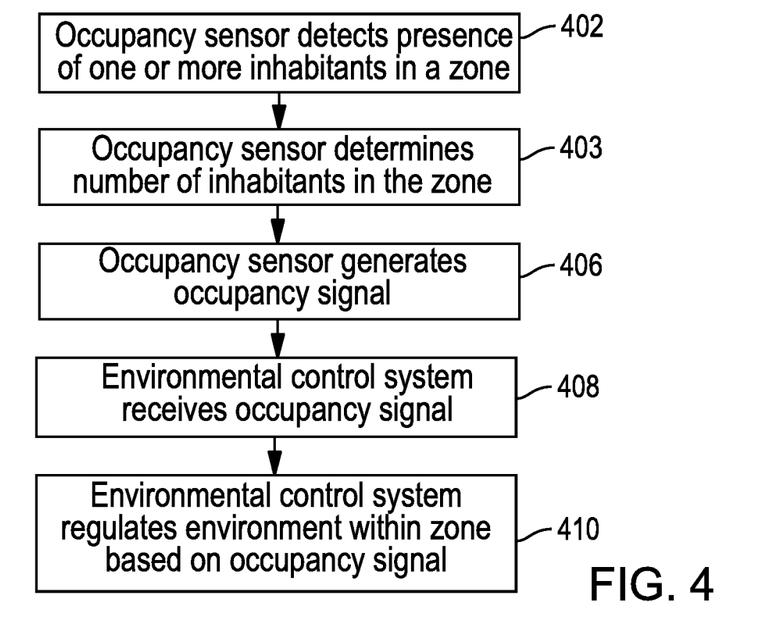
FIG. 4 is a block diagram illustrating a method for regulating an environmental variable within a target zone, according to one embodiment.
Figure 5:
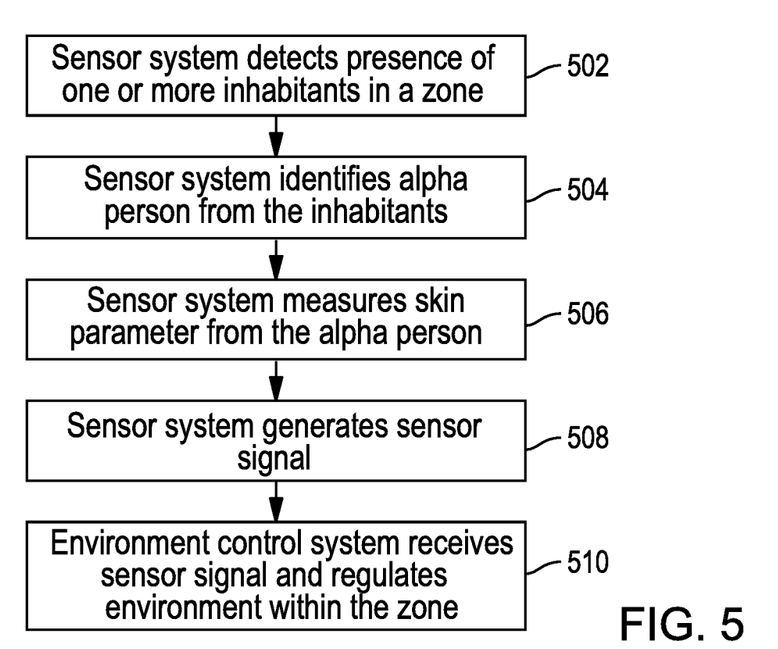
FIG. 5 is a block diagram illustrating a method for regulating an environmental variable within a target zone, according to another embodiment.

In other embodiments, as noted previously, the system may be configured to detect a presence of multiple inhabitants in a target zone and, based on the number of inhabitants within the zone, the environmental control system may be configured to regulate the environmental variable within the zone. FIGS. 3-5 collectively illustrate example embodiments of such a system 100. The system 100 may include many of the same or similar components as the system 10. Accordingly, to avoid unnecessarily repeating the description for structure and function of certain components, reference numbers in the 100-series having the same final two digits as those in FIG. 1 are used in FIG. 3 to identify analogous structures. For example, it should be understood that processor 30 as described with reference to FIG. 1 may be identical to and capable of carrying out the same calculations and protocols as processor 130 of FIG. 3. Accordingly, some detail of these structures may not be further described to avoid obscuring more pertinent aspects of the embodiments. Instead, the following discussion focuses more on certain differences and additional features of these and other components of the system 100 with reference to FIGS. 3-5.

FIG. 3 is a schematic drawing of the system 100 for regulating an environmental variable within a building 114. With particular reference to FIG. 3, the system 100 includes a sensor system 120 configured to monitor the room 112 and measure a skin parameter (e.g., skin temperature, skin humidity, sweat present on the skin) in real time from one or more inhabitants or occupants 118 (e.g., people) in the room 112. A processor 130 in operative communication with the sensor system 120 receives the measured skin parameter and determines a variance between the measured skin parameter and a threshold setpoint (which may be stored in a database 150) for at least one of the inhabitants 118. Thereafter, the processor 130 generates a signal to communicate the calculated variance to an environmental control system 140, which may be a heating, ventilation, and air-conditioning (HVAC) system. Based on the signal received from the processor 130, the environmental control system 140 determines whether and how to regulate an environmental variable (e.g., ambient room temperature and/or humidity) within the target zone 112 to create a comfortable environment for the occupants 118. For example, the environmental control system 140 may activate an air-conditioner or a heater to alter the room temperature in the room 112. The following description provides additional details of these and other embodiments of the system 100.

The sensor system 120 may be mounted to or otherwise supported by one or more of the interior walls 116, ceilings, floors, or other interior surfaces in each of the rooms 112. The sensor system 120 includes one or more occupancy sensors 122 configured to monitor the room 112 and determine a number of inhabitants 118 present therein. Upon determining the number of inhabitants 118, the occupancy sensors 122 (or sensor system 120) generate an occupancy signal to communicate the number of inhabitants 118 present within the zone 112 to the environmental control system 140 as described in further detail below.

The sensor system 120 includes one or more measurement sensors 124 (such as infrared imaging system or cameras) that monitor the zone 112 and measure a skin parameter from at least one of the multiple inhabitants 118 present in the room 112. In other embodiments, the measurement sensors 124 measure a skin parameter from each of the multiple inhabitants. As mentioned previously, the skin parameter may be skin temperature or sweat used to determine whether the person is too hot or too cold, at which point the environmental control system 140 regulates the room condition accordingly.

As noted previously with relation to the sensor system 20 of FIG. 1, the sensor system 120 may measure the skin parameter at one time (such as shortly after each of the inhabitants walks into the room), or may measure skin parameters at various intervals to account for people 118 coming into and leaving the room 112. In some embodiments, the sensor system 120 may include a monitoring system 160, such as door sensors or light curtains as explained previously, positioned on or adjacent a door (or other entrance/exit) of the room 112 to monitor the inhabitants as they enter or exit the room 112. By monitoring the flow of inhabitants 118 into and out of the room 112 in real time, the system 100 is able to anticipate and respond to changes in the room 112 to regulate the environment.

The system 100 further includes a storage medium or database 150 having stored therein a threshold setpoint relating to the skin parameter. As is explained in further detail below, the environmental control system 140 may use the variance between the measured skin temperature and the threshold setpoint stored in the storage medium 150 to determine whether and how to regulate the ambient temperature.

Similar to the storage medium 50 of FIG. 1, the storage medium 150 may further include a plurality of user profiles stored therein, where each of the user profiles includes one or more user-specific variables to accommodate that user's needs. As is described in further detail below, the storage medium 150 may further include information relating specifically to an alpha person 119, whose preferred threshold setpoint may be used to regulate the environment. Additional details of how the system 100 identifies and uses measurements from the alpha person 119 are described in further detail below.

The system 100 further includes a processor 130, which is in operative communication with the sensor system 120 and the storage medium 150, such as via a network 170. Similar to the processor 30, the processor 130 drives various functions of the system 100 as further described below.

As mentioned previously, the environmental control system 140 is in operative communication with the occupancy sensors 122 (and/or the sensor system 120) and receives the occupancy signal therefrom communicating the number of inhabitants 118 present within the room 112. Based on this signal, the environmental control system 140 determines how to regulate the environmental variable, such as room temperature or humidity, to provide a comfortable setting for the inhabitants 118 based on the number of inhabitants 118 present in the room 112. Similar to the embodiment described previously, the environmental control system 140 may be a heating, ventilation, and air-conditioning (HVAC) system having a heating mode and a cooling mode. In some embodiments, the environmental control system 140 and the processor 130 may be integrated as a single system.

The following section describes various examples illustrating a process that may be used to regulate an environmental variable of the room 112 via the system 100. In one example process, one or more inhabitants 118 walk into the room 112. One or more occupancy sensors 122 detect a presence of the inhabitants 118 in the room 112 and determine a number of inhabitants 118 present in the room 112. Thereafter, the occupancy sensors 122 (or the sensor system 120) generate an occupancy signal to communicate the number of inhabitants 118 present in the room 112 to the environmental control system 140. The environmental control system 140 receives the occupancy signal and regulates an environmental variable (such as room temperature) within the room 112 based on the number of inhabitants 118. The amount of heating and/or cooling applied by the environmental control system 140 may correspond directly to the number of inhabitants 118 present in the room 112. For example, as the number of inhabitants 118 present in the room 112 increases beyond a certain threshold, the environmental control system 140 may apply increased amounts of cool air into the room 112 to maintain the room 112 at a comfortable level.

In some embodiments, the occupancy sensors 122 continuously monitor the number of inhabitants 118 in the room 112 and send occupancy signals to the environmental control system to regularly adjust the environmental accordingly based on a real-time occupancy of the room 112. For example, the occupancy sensors 122 and/or the monitoring system 160 may be configured to monitor an entrance or an exit of one or more of the inhabitants 118 into or out of the zone 112. As the number of inhabitants 118 present in the room 112 increases, the environmental control system 140 may automatically increase the amount of cooling applied (or decrease the amount of heating applied) to reduce the temperature in the room 112. Similarly, when the number of inhabitants 118 present in the room 112 decreases, the environmental control system 140 may automatically increase the amount of heating applied (or decrease the amount of cooling applied) to increase the temperature in the room 112.

In other embodiments, the environmental variable controlled by the environmental control system 140 may be humidity. In such embodiments, the environmental control system may automatically increase the humidity within the zone as the number of inhabitants 118 present within the zone decreases. Similarly, the environmental control system may automatically decrease the humidity within the zone as the number of inhabitants 118 present within the zone increases.

In some embodiments, the one or more measurement sensors 124 may also measure the skin temperature from some (i.e., a plurality) or all of the inhabitants present in the room 112 and generate a sensor signal to communicate this measurement to the processor 130. Upon receiving the signal, the processor 130 queries the storage medium 150 to determine the threshold setpoint. Thereafter, the processor 130 determines a variance between the measured skin parameter and the threshold setpoint and generates an operation mode signal to communicate the variance to the environmental control system 140. Upon receiving the operation mode signal, the environmental control system 140 directly or indirectly activates a cooling mode or a heating mode as needed based on both the operation mode signal and the occupancy signal.

As mentioned above, the processor 130 determines a variance between the measured skin parameters from the inhabitants and a threshold setpoint and generates the operation mode signal. It should be understood that the processor 130 may use any one of a number of different calculation protocols to determine the variance. For example, in one embodiment, the processor 130 may determine a variance for each of the inhabitants 118 present in the room. Thereafter, the processor 130 may aggregate the variances and determine an average variance for the inhabitants 118 in the room and generate the operation mode signal based on the average aggregate variance. If the average variance from the inhabitants 118 is −1° C. (indicating that the average person in the room is cold), the operation mode signal may drive the environmental control system 140 to apply more heat to the room. In other embodiments, the processor 130 may instead select the minimum variance from all the inhabitants 118 as compared to the threshold setpoint (e.g., the coldest person with the most negative variance); or select the maximum variance as compared to the threshold setpoint (e.g., the hottest person with the most positive variance); or determine a standard deviation of the variances and generate the operation mode signal based on the standard deviation.

In other embodiments, the processor 130 may not calculate a variance, but instead determine an average value of the skin parameter for each of the inhabitants 118 and compare that average value to the threshold setpoint, or select an extreme value (e.g., the highest or the lowest skin temperature) of the skin parameter from the inhabitants 118 in the room 112 and compare that to the threshold setpoint. It should be understood that while the foregoing examples use skin temperature as an example skin parameter, the system 100 may also use other variables to determine how to control the environmental variable in the room 112. As noted previously, the system 100 may use measurements of sweat, humidity, or other suitable variables.

As noted previously, the environmental control system 140 may receive both the occupancy signal and the operation mode signal. In some embodiments, the environmental control system 140 may determine how to regulate the room 112 based on both signals. In other embodiments, the occupancy signal may take precedence over the operation mode signal. For example, in one scenario, the occupancy signal may indicate that there are thirty people in the room and the operation mode signal may indicate that the room should be heated because the average variance of the inhabitants 118 is −1° C. Upon receiving the signals, the environmental control system 140 may essentially ignore the operation mode signal and instead not apply heat to the room 112, anticipating that the room 112 will naturally warm up over time from the body heat generated by the thirty people occupying the room.

In some embodiments, the database 150 may further include calendar or event information including data regarding an expected number of inhabitants 118 in the room 112 for a specific period of time. In such embodiments, the calendar/event information may also play a role in how the environmental control system 140 regulates the environment. For example, in one scenario, the calendar/event information indicates that fifty people are expected for an event taking place between 6:00 pm and 9:00 pm. At 6:30 pm, the occupancy sensors 122 indicate that there are currently twenty people in the room 112, and the measurement sensors 124 indicate that the average variance for the inhabitants 118 is −1° C. (in other words, the average person is a bit cold). Based on the expected occupancy and the time of day (e.g., still near the beginning of the event), the environmental control system 140 may anticipate that the additional thirty people will heat up the room 112, and so the environmental control system 140 may not apply heat to the room 112. At 7:00 pm, the occupancy sensors 122 indicate that there are currently forty-five people in the room 112 and the average variance for the inhabitants 118 is now +1° C. (indicating that the average person is warm). At this point, since most of the expected inhabitants 118 are in the room 112 and the event is well on its way, the environmental control system 140 may activate an air conditioner and apply cool air to the room 112 to create a more comfortable environment. At 8:15 pm, the occupancy sensors 122 may indicate that there are now twenty people in the room 112 and the average variance for the inhabitants 118 is now −1° C. Since the time of day indicates that the event is winding down and it is unlikely that more people will arrive, the environmental control system 140 may activate a heating mode and apply heat to the room 112 to increase the temperature and create a comfortable environment for the remaining guests.

In other embodiments, the database 150 may further include outdoor temperature data (e.g., average highs and lows for the region, or real-time weather for the region, etc.) stored therein for every day (or months) of the year. In such embodiments, the outdoor temperature may factor into the operation of the environmental control system 140. For example, if the temperature data indicates that the outdoor temperature is 100° F. and the room 112 is expected to hold fifty people, the environmental control system 140 may anticipate that the people will be warm or hot upon arrival and activate the cooling system in advance of the event date to provide a comfortable atmosphere. In another example, if the temperature data indicates that the outdoor temperature is 10° F. and the room 112 is expected to hold fifty people, the environmental control system 140 may initially heat the room so that people are comfortable upon arrival, but may thereafter avoid continually heating the room or instead activate the cooling system to account for the body heat generated from the occupants when the room reaches is expected capacity.

As noted previously, in some embodiments, the system 100 may be capable of identifying an alpha person 119 from the one or more of the inhabitants 118 in the target zone 112 and controlling the environment based on the alpha person 119. With reference to FIG. 3, the sensor system 120 may include a tagging system 180 configured to identify the alpha person 119. The alpha person 119 may be used as a baseline by which the environmental control system 140 regulates the room 112. Once the alpha person 119 is identified, the measurement sensor 124 may measure a skin parameter from the alpha person 119 (and may otherwise ignore every other inhabitant in the room 112) and generate a sensor signal based on the measured skin parameter. The sensor signal may be communicated to the environmental control system 140, which receives the signal and regulates the environmental variable within the room 112 based on the sensor signal.

In one example process, once the alpha person 119 is identified, the processor 130 may query the storage medium 150 to obtain the threshold setpoint corresponding to the alpha person 119. Thereafter, the processor 130 may determine a variance for the alpha person 119 based on the measured skin parameter and threshold setpoint. In a similar fashion as described previously, the processor 130 generates an operation mode signal based on the variance to drive the environmental control system 140 to heat or cool the zone 112 based on the measurements taken from the alpha person 119. In some embodiments, the system 100 may use only the data obtained from the alpha person 119 to regulate the environmental variable in the room 112. In other embodiments, the data from the alpha person 119 may be combined with the occupancy in the room 112 (as determined by the occupancy sensors 122) to regulate the environmental variable.

The alpha person 119 may be identified using various methods. For example, in one embodiment, the measurement sensors 124 may obtain skin temperatures from each of the inhabitants 118 in the room 112 and the processor 130 may identify the alpha person 119 as the person having the maximum skin temperature, or the minimum skin temperature, or the median skin temperature. In other embodiments, the skin parameter may be sweat, and the processor 130 may identify the alpha person 119 as the person the most sweat, the least sweat, or median sweat from the inhabitants in the room 112. In other embodiments, the tagging system 180 may include an input system (not shown), such as a keyboard, keypad, microphone, or other device. The input system may be used by the alpha person 119 to identify himself or herself in the room 112 for the system 100, such as by logging on to the input system.

In some embodiments, the tagging system 180 may include a facial recognition system configured to capture an image of one or more inhabitants 118 in the room 112 and compare the captured image(s) with a stored image of the alpha person 119 to determine whether the alpha person 119 is in the room 112. The stored image may be stored in a memory of the facial recognition system, in the database 150, or another suitable location in communication with the tagging system 180. If the alpha person 119 is located in the room 112, then the system 100 may run the environment control protocols tailored specifically to the alpha person 119. If the alpha person 119 is not in the room 112, then the system 100 may operate under different settings, such as those described previously (e.g., using the variance calculations for each inhabitant, or using the occupancy in the room, etc.).

In still other embodiments, the tagging system 180 may comprise an automatic identification and data capture (AIDC) system to automatically detect the alpha person 119 when present in the room 112. The AIDC system may include a tag (not shown), such as an radio frequency identification (RFID) tag or a tag readable by a machine-vision system, and a tag reader (not shown), such as an RFID reader configured to detect the RFID tag or a machine-vision system for reading the tag. The tag may be carried by the alpha person 119 (such as in a pants pocket, shirt pocket, embedded in clothing worn by the user, or embedded in an electronic device, such as a phone), wherein the tag reader is configured to capture data from the tag to detect the presence of the alpha person 119. In some embodiments, the tag may include identification and other information for its wearer/carrier, such as the name of the alpha person 119, and preferences regarding threshold setpoint data or other data.

The tag and tag reader may be any one of a variety of suitable devices. For example, in one embodiment, the tag may be a beacon emitting radiation and the tag reader may be a detector for the radiation. The radiation may comprise at least one of ultrasonic radiation, radio frequency radiation, infrared radiation, visible radiation, or ultraviolet radiation. In some embodiments, the tag may be an RFID tag, such as an active RFID tag, and the tag reader may be an RFID reader. The RFID tag may be an active or passive RFID tag, and the RFID reader may be an active or passive RFID reader.

In one embodiment, the RFID tag may be an active RFID tag and the tag reader may be a passive RFID reader configured to receive a signal from the active RFID tag. In other embodiments, the RFID tag may instead be a passive RFID tag and the RFID reader may instead be an active RFID reader configured to transmit interrogatory signals and receive data from the passive RFID tag. In yet other embodiments, RFID tag is an active RFID tag and the tag reader is an active reader configured to transmit interrogatory signals, wherein the RFID tag is activated in response to receiving the interrogatory signal.

In other embodiments, a combination of some or all of these methods may be used. For example, when the alpha person 119 walks into the room 112, the alpha person 119 may log on to the input system to identify himself or herself. Thereafter, the alpha person 119 may carry an RFID tag or the tagging system 180 may run the facial recognition software so that the sensor system 120 is able to locate the alpha person 119 and capture skin parameter measurements at various time points to determine whether and how to control the environment in the room 112.

FIG. 4 is a block diagram illustrating a method of regulating an environmental variable in a target zone according to one embodiment. It should be understood that the method described below is for illustration purposes and the order in which the steps are described is not meant to be limiting. In addition, it should be understood that in other embodiments, the steps may occur in a different order. With particular reference to FIG. 4, in some embodiments, at step 402, an occupancy sensor monitors a target zone to detect a presence of one or more inhabitants within the room. Once the inhabitants are detected, the occupancy sensor determines a number of inhabitants present within the zone at step 404.

At step 406, the occupancy sensors generate an occupancy signal communicating the number of inhabitants present within the zone to the environmental control system. At step 408, the environmental control system, which is in operative communication with the occupancy sensor, receives the occupancy signal. At step 410, upon receiving the occupancy signal, the environmental control system regulates an environmental variable within the zone based on the number of inhabitants present within the zone as communication via the occupancy signal.

In some embodiments, the method may further include the steps of obtaining a measurement of a skin parameter from at least one of the one or more inhabitants in the zone via a measurement sensor. Thereafter, the measurement sensor generates a sensor signal based on the measured skin parameter and communicates the sensor signal to the environmental control system. Upon receiving the sensor signal, the environmental control system regulates the environmental variable within the zone based further on the measured skin parameters as communicated via the sensor signal. In some embodiments, the environmental control system may regulate the environmental variable based on both the occupancy signal and the sensor signal. In other embodiments, the environmental control system may regulate the environmental variable based primarily on the occupancy signal and adjust as needed based further on the sensor signal.

FIG. 5 is a block diagram illustrating a method of regulating an environmental variable in a target zone according to one embodiment. It should be understood that the method described below is for illustration purposes and the order in which the steps are described is not meant to be limiting. In addition, it should be understood that in other embodiments, the steps may occur in a different order. With reference to FIG. 5, in some embodiments, at step 502, a sensor system monitors a target zone to detect a presence of one or more inhabitants within the room. Once the inhabitants are detected, the sensor system identifies an alpha person from the one or more inhabitants in the zone at step 504.

At step 506, a measurement sensor, which monitors the zone, measures a skin parameter from the identified alpha person. At step 508, the measurement sensor generates a sensor signal based on the measured skin parameter and communicates the sensor signal to the environmental control system. At step 510, upon receiving the sensor signal, the environmental control system regulates an environmental variable within the zone based on the measured skin parameter from the alpha person as communicated via the sensor signal.

In some embodiments, the method may further include the steps of a processor querying a storage medium to retrieve a threshold setpoint for the alpha person, the threshold setpoint being a target skin parameter. Thereafter, the processor determines a variance between the measured skin parameter and the threshold setpoint for the identified alpha person. The variance indicates whether the measured skin parameter is greater than or less than the threshold setpoint. Thereafter, the processor generates an operation mode signal based on the determined variance between the measured skin parameter and the threshold setpoint. The environmental control system receives the operation mode signal and regulates the zone based further on the operation mode signal. In some embodiments, the operation mode signal may indicate whether to activate a cooling mode or heating mode of the environmental control system.

Other embodiments are possible. Although the description above contains much specificity, these details should not be construed as limiting the scope of the invention, but as merely providing illustrations of some embodiments of the invention. As noted previously, the systems 10, 100 have many common components. To avoid duplication, specific features and capabilities of these common components may be described with respect to one system and not the other system. It should be understood that subject matter disclosed in one portion herein can be combined with the subject matter of one or more of other portions herein as long as such combinations are not mutually exclusive or inoperable.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A system for regulating an environmental variable, the system comprising:
   at least one sensor configured to monitor a target zone, the at least one sensor measuring at least one skin parameter from multiple inhabitants occupying the target zone and generating a sensor signal communicating the measured at least one skin parameter;
   a storage medium having stored therein a threshold setpoint relating to the measured at least one skin parameter;
   a processor in operative communication with the at least one sensor and the storage medium, the processor receiving the sensor signal from the at least one sensor and determining a variance between each measured skin parameter and the threshold setpoint, the processor generating an operation mode signal based on a function of the determined variances; and
   an environmental control system in operative communication with the processor, the environmental control system receiving the operation mode signal and regulating an environmental variable within the target zone based on the operation mode signal.

2. The system of claim 1, wherein the environmental control system is a heating, ventilation, and air-conditioning (HVAC) system having a heating mode and a cooling mode, wherein the environmental variable is an ambient temperature, wherein the skin parameter is skin temperature, and wherein the threshold setpoint is a target skin temperature.

3. The system of claim 2, wherein the processor compares the measured skin temperatures to the target skin temperature, and wherein the HVAC system regulates the temperature within the target zone based on an average variance between the measured skin temperatures of the inhabitants and the target skin temperature.

4. The system of claim 3, wherein when the variance is a positive variance, indicating that an average measured skin temperature is higher than the target skin temperature, the operation mode signal directly or indirectly activates the cooling mode of the HVAC system to decrease the temperature within the target zone.

5. The system of claim 3, wherein when the variance is a negative variance, indicating that an average measured skin temperature is lower than the target skin temperature, the operation mode signal directly or indirectly activates the heating mode of the HVAC system to increase the temperature within the target zone.

6. The system of claim 1, wherein the threshold setpoint stored in the storage medium is updated based on a temperature of an external zone relative to the target zone.

7. The system of claim 1, wherein the storage medium further includes information regarding a date or time of day, and wherein the threshold setpoint stored in the storage medium is updated based on the date or time of day when the multiple inhabitants are occupying the target zone.

8. The system of claim 1, wherein the skin parameter is sweat, and wherein the at least one sensor measures a presence of sweat based on skin reflectivity.

9. The system of claim 1, wherein the at least one sensor measures the at least one skin parameter at a first time point and at a subsequent second time point, and wherein the processor further determines a skin parameter trend by comparing at least one skin parameter measured at the first time point and at least one skin parameter measured at the second time point with at least one skin parameter measured at a third time point at or subsequent to the second time point, the skin parameter trend indicating whether the at least one skin parameter has increased or decreased from the first time point to the second time point.

10. The system of claim 9, wherein when the skin parameter trend indicates that at least one skin parameter has decreased, the operation mode signal directly or indirectly activates a heating mode of the environmental control system to regulate the environmental variable within the target zone.

11. The system of claim 9, wherein when the skin parameter trend indicates that at least one skin parameter has increased, the operation mode signal directly or indirectly activates a cooling mode of the environmental control system to regulate the environmental variable within the target zone.

12. The system of claim 1, wherein the at least one sensor measures at least one skin parameter at a first time point and at a subsequent second time point, and wherein the processor determines a first variance between the measured at least one skin parameter and the threshold setpoint at the first time point and a second variance between the measured at least one skin parameter and the threshold setpoint at the second time point.

13. The system of claim 12, wherein the processor further determines a variance trend by comparing the first and second variances at a third time point at or subsequent the second time point, the variance trend indicating whether the variance has increased or decreased from the first time point to the second time point.

14. The system of claim 13, wherein when the variance trend indicates that the variance has decreased, the operation mode signal directly or indirectly activates a heating mode of the environmental control system to regulate the environmental variable within the target zone.

15. The system of claim 13, wherein when the variance trend indicates that the variance has increased, the operation mode signal directly or indirectly activates a cooling mode of the environmental control system to regulate the environmental variable within the target zone.

16. The system of claim 1, wherein the at least one sensor measures the at least one skin parameter at a first time point and at a subsequent second time point, wherein the processor further determines a rate of change relating to the at least one skin parameter based on the first and second time points, and wherein the operation mode signal directly or indirectly activates the environmental control system to operate a heating or cooling mode at a heating or cooling rate corresponding to the rate of change relating to the at least one skin parameter.

17. The system of claim 13, wherein the operation mode signal directly or indirectly activates the environmental control system to operate a heating or cooling mode to regulate the environmental variable within a predetermined tolerance range based on the variance trend.

18. The system of claim 13, wherein the skin parameter is skin temperature, the environmental control system is a heating, ventilation, and air-conditioning (HVAC) system having a heating mode and a cooling mode, and wherein the environmental variable is an ambient temperature.

19. The system of claim 18, wherein when the variance trend indicates that the skin temperature has decreased, the operation mode signal directly or indirectly activates the heating mode of the HVAC system to increase the ambient temperature within the target zone.

20. The system of claim 18, wherein when the variance trend indicates that the skin temperature has decreased, the operation mode signal directly or indirectly deactivates the cooling mode of the HVAC system to avoid decreasing the ambient temperature within the target zone.

21. The system of claim 18, wherein when the variance trend indicates that the skin temperature has increased, the operation mode signal directly or indirectly activates the cooling mode of the HVAC system to decrease the ambient temperature within the target zone.

22. The system of claim 18, wherein when the variance trend indicates that the skin temperature has increased, the operation mode signal directly or indirectly deactivates the heating mode of the HVAC system to avoid increasing the ambient temperature within the target zone.

23. The system of claim 18, wherein the processor further determines a rate of change relating to the skin temperature based on the first and second time points, wherein the operation mode signal directly or indirectly activates the HVAC system to operate the heating or cooling mode at a heating or cooling rate corresponding to the rate of change relating to the skin temperature.

24. The system of claim 18, wherein the operation mode signal directly or indirectly activates the HVAC system to operate the heating or cooling mode to regulate the ambient temperature within a predetermined tolerance range based on the variance trend.

25. The system of claim 18, wherein the at least one sensor measures the skin parameter at a third time point subsequent the second time point, and wherein the processor determines a third variance between the measured skin temperature and the threshold setpoint at the third time point.

26. The system of claim 25, wherein the processor further determines a variance trend by comparing the first, second, and third variances at a fourth time point at or subsequent the third time point, the variance trend indicating whether the skin temperature has increased or decreased between the first time point and the third time point.

27. The system of claim 26, wherein when the variance trend indicates that the skin temperature has decreased, the operation mode signal directly or indirectly activates a heating mode of the HVAC system to increase the ambient temperature within the target zone.

28. The system of claim 26, wherein when the variance trend indicates that the skin parameter has increased, the operation mode signal directly or indirectly activates a cooling mode of the HVAC system to decrease the ambient temperature within the target zone.

29. The system of claim 26, wherein the processor further determines a rate of change relating to the skin parameter based on the first and second time points, wherein the operation mode signal directly or indirectly activates the HVAC system to operate a heating or cooling mode at a heating or cooling rate corresponding to the rate of change relating to the skin parameter.

30. The system of claim 26, wherein the operation mode signal directly or indirectly activates the HVAC system to operate a heating or cooling mode to regulate the ambient temperature within a predetermined tolerance range based on the variance trend.

31. A method for regulating an environmental variable, the method comprising:
monitoring, via a at least one sensor, a target zone;

measuring, via the at least one sensor, at least one skin parameter from multiple inhabitants occupying the target zone;

generating, via the at least one sensor, a sensor signal communicating the measured skin parameter;

receiving, via a processor in operative communication with the at least one sensor and a storage medium, the sensor signal from the at least one sensor;

querying, via the processor, the storage medium to retrieve a threshold setpoint relating to the measured at least one skin parameter;

determining, via the processor, a variance between each measured skin parameter and the threshold setpoint;

generating, via the processor, an operation mode signal based on a function of the determined variances;

receiving, via an environmental control system in operative communication with the processor, the operation mode signal; and regulating, via the environmental control system, an environmental variable within the target zone based on the operation mode signal.

32. The method of claim 31, wherein the threshold setpoint comprises a target skin temperature, the method further comprising:

comparing, via the processor, each measured skin temperature to the target skin temperature; and regulating, via the HVAC system, the temperature within the target zone based on an average of the variances between the skin temperature of each inhabitant and the target skin temperature.

33. The method of claim 32, further comprising activating the cooling mode of the HVAC system to decrease the temperature within the zone when the variance is a positive variance, indicating that the average measured skin temperature is higher than the target skin temperature.

34. The method of claim 32, further comprising activating the heating mode of the HVAC system to increase the temperature within the zone when the variance is a negative variance, indicating that the average measured skin temperature is lower than the target skin temperature.

35. The method of claim 31, further comprising:

measuring, via the at least one sensor, at least one skin parameter at a first time point and at a subsequent second time point; and determining, via the processor, a skin parameter trend by comparing the at least one skin parameter at a third time point at or subsequent the second time point, the skin parameter trend indicating whether the at least one skin parameter has increased or decreased from the first time point to the second time point.

36. The method of claim 35, further comprising activating, directly or indirectly, the heating mode of the environmental control system to regulate the environmental variable within the target zone when the skin parameter trend indicates that the at least one skin parameter has decreased.

37. The method of claim 35, further comprising activating, directly or indirectly, the cooling mode of the environmental control system to regulate the environmental variable within the target zone when the skin parameter trend indicates that the at least one skin parameter has increased.

38. The method of claim 31, further comprising:

measuring, via the at least one sensor, at least one skin parameter at a first time point and at a subsequent second time point;

determining, via the processor, a rate of change relating to the at least one skin parameter based on the first and second time points; and activating the environmental control system to operate a heating or cooling mode at a heating or cooling rate corresponding to the rate of change relating to the at least one skin parameter.

39. The method of claim 38, further comprising:

determining, via the processor, a rate of change relating to the skin temperature based on the first and second time points; and activating the HVAC system to operate a heating or cooling mode at a heating or cooling rate corresponding to the rate of change relating to the skin temperature.

40. A computer-readable storage medium comprising program code that, when executed by a processor, performs method for regulating an environmental variable, the method comprising:

monitoring, via a at least one sensor, a target zone;

measuring, via the at least one sensor, at least one skin parameter from multiple inhabitants occupying the target zone;

generating, via the at least one sensor, a sensor signal communicating the measured skin parameter;

receiving, via a processor in operative communication with the at least one sensor and a storage medium, the sensor signal from the at least one sensor;

querying, via the processor, the storage medium to retrieve at least one threshold setpoint relating to the measured at least one skin parameter;

determining, via the processor, a variance between each measured skin parameter and the threshold setpoint;

generating, via the processor, an operation mode signal based on a function of the determined variances;

receiving, via an environmental control system in operative communication with the processor, the operation mode signal; and regulating, via the environmental control system, an environmental variable within the target zone based on the operation mode signal.

* * * * *